Patented July 16, 1940

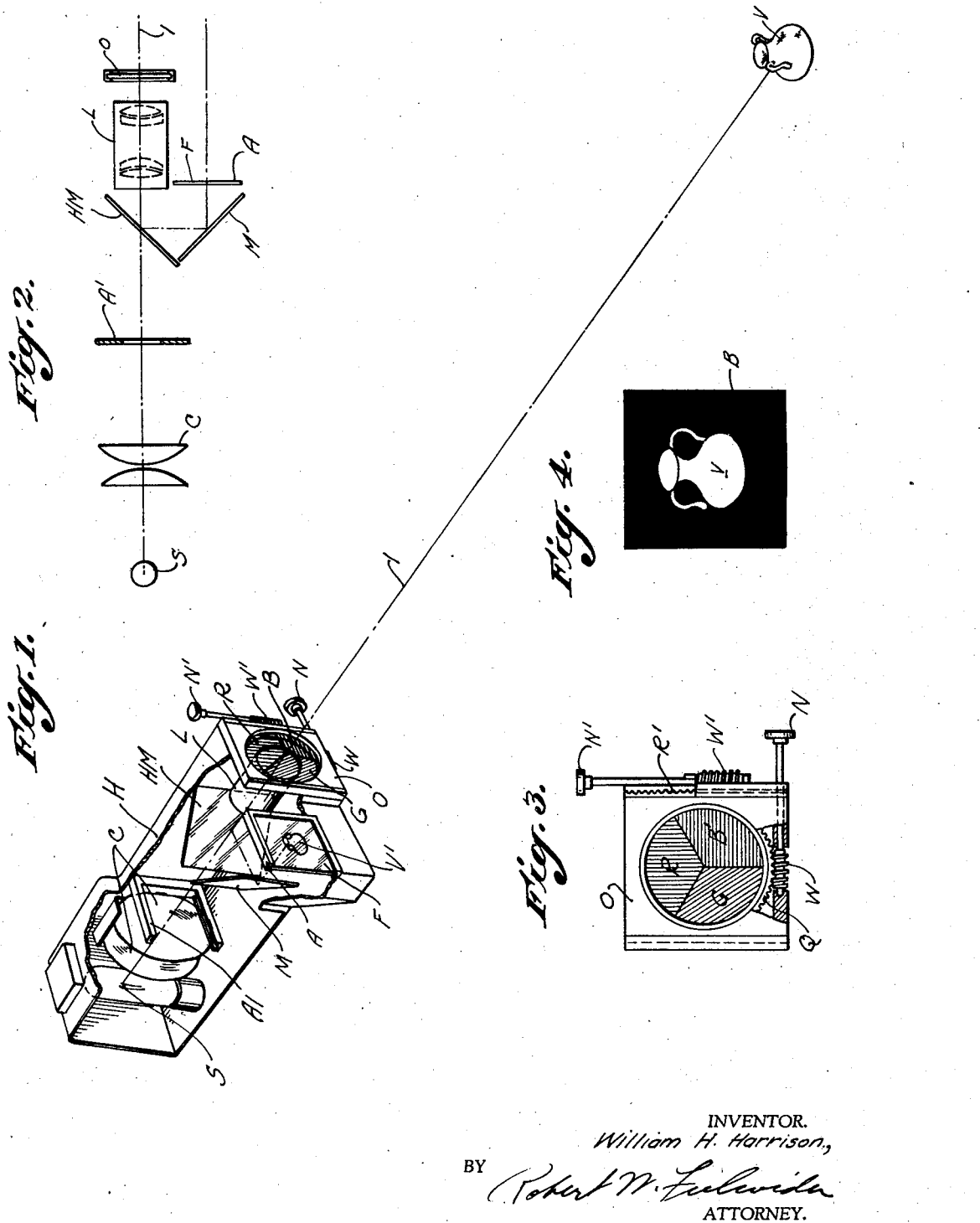

2,207,919

UNITED STATES PATENT OFFICE 2,207,919

METHOD AND MEANS OF CONTROLLING ILLUMINATION

William H. Harrison, Los Angeles, Calif.

Application August 31, 1937, Serial No. 161,831

2 Claims. (Cl. 88—24)

This invention relates generally to artificial illumination and specifically to the illumination of paintings, art objects, statues, advertising display and the like by projecting a controlled beam of light that is exactly the same shape as the outline or area of the object to be illuminated.

It has been found that when any statue, art object, painting, etc. is illuminated by hiding the position of the light source as for instance high up in a wall with only a small opening for the beam to pass through, and the beam projected in such a manner that it forms the exact outline shape of the object so that no spill light is evidenced around the object, it is impossible for an observer to tell that the object or painting is being illuminated from an exterior source, thereby creating an optical illusion that the statue or object is luminous, or a painting has more of a third dimensional appearance. Also, by changing the color of the beam, the luminous object appears to change in luminous color or paintings change in effect.

It is therefore the object of this invention to create these illusions by projecting a controlled beam of light, together with simple and novel means of making the beam the exact shape of the object or any predetermined area when projected from any distance or angle. Also, by a novel means to change the color of the light continuously to other colors, or create any single color or shade of color that is desired. Other objects of this invention will become evident in the reading of the following specification and drawing in which:

Fig. 1 is a perspective view of an outline making and projection system and object to be illuminated.

Fig. 2 is a plan view of the optical system of the device of Fig. 1.

Fig. 3 is a front elevation of the device for changing the color of the beam and mechanical means for actuating same.

Fig. 4 is a blocked out outline made on the projector system of the object shown in Fig. 1.

Now, referring specifically to the drawing:

As seen best in Fig. 1, H is a lamp housing broken away to show a light source S, condensing lenses C, projection aperture AI, corrected lens L, half-silvered mirror HM, full silvered mirror M, taking aperture A and a ground glass F slidably mounted in taking aperture A. R, G and B are respectively red, green and blue filters and O a support for the filters, V the object to be illuminated and I a beam of light passing to or from object V.

As seen best in Fig. 2, S is a light source, C a pair of condensers, AI a projection aperture, HM a partial reflecting mirror, Ma full reflecting mirror, A an image aperture, L a lens, O the mount for the three filters R, G and B', and I a beam of light.

In Fig. 3 R, G and B' are respectively red, green and blue filters, N is a shaft having a worm gear W mounted thereon and Q is a gear containing the filters that may be rotated by turning shaft N. NI is another shaft having a worm gear WI mounted thereon which engages a rack RI fastened to the filter housing O and capable of being moved up and down by turning shaft NI.

In actual practice, the method of creating and projecting a controlled beam the shape of any object with this device is to first illuminate the object V with other light sources. Some of the light reflected thus from the object will be picked up by the lens L. A major portion will then pass through the partially silvered mirror HM to form an image of V at the projection aperture AI. The balance of the light will be reflected from the partially silvered mirror HM to the full silvered mirror M, where it will be reflected onto the ground glass F, in taking aperture A, and visible to the eye in the form of a ground glass image identical with the image formed at the projection aperture AI, as the optical distance from the partially silvered mirror HM to the ground glass is the same as the distance from mirror HM to the aperture AI.

When the object is focused on the ground glass and centered, the projector is securely locked or fastened in that position so that it cannot in any way move and although the projection system may be imbedded in a wall with only a small opening for the collecting lens to view through, the operator can readily see the image on the ground glass as it is best seen by looking at the front of the projector. The image of the object V on the ground glass can then be traced with a sharp pencil or pen around its entire outline. When this is done it may be removed and placed in the projection aperture AI, where the light S can be turned on and the penciled outline on the ground glass be projected on the object V to see that it exactly matches the outline of the object. If it does, it can be removed from the projection aperture and the area around the outline filled in with a suitable black ink so as to make an opaque mat with the outline of the object clear ground glass, as shown in Fig. 4. The mat thus made can be checked as many times as necessary to see that its projected image exactly matches the object, by merely placing it in the taking aperture and then in the projection aperture. When the mat is finished in this manner, the ground glass diffusion may be removed by flowing a coating of gum solution whose index of refraction when dry is approximately the same as that of the glass support. When a solution whose index is approximately the same as the ground glass is flowed over it and allowed to dry, the film of gum fills up the diffusing indentation in the glass and, being the same index, the rough surface of the glass becomes optically smooth, and the top surface of the gum solution now becomes the optical surface. Therefore, the ground glass area of the mat will transmit light the same as a clear piece of glass. The gum solution not only eliminates the ground glass optically, but at the same time acts as a protective coating for the opaque area of the mat.

The finished mat is then placed in the projection aperture A1 and its image projected on the object V, which will then appear luminous. As the filter sectors divide the beam into three equal parts at the lens as shown in Fig. 1, the beam at this point will have the three colors approximately the same shape and color as that of the sectors. However, as the lens focusing the mat on the object crosses all component rays of the beam at the focus which in this case is the object area the rays of the beam having the three additive primary colors will be crossed and overlap at the focus. This overlapping of the additive primary colors creates white light at the point of overlapping and is rendered visible by the diffused reflection of the object illuminated. If the color of the light on the object is to be varied, it can be done by simply moving the filters R, g and B' off center by turning shaft N1. As soon as the balance of the light passing equally through the three filters is disturbed by allowing more light to come through one or two of the sectors, the white light on the object will change toward the color of the filter which is passing more of the light. By turning shaft N and rotating the filters, a predominance of any color can be had as one by one, upon rotation the filters R, G and B' will occupy the position where they cover the larger area of the lens. The degree of color change from white can be controlled by the amount of decentering of the filter sectors until they are moved to where only one filter covers the lens. Obviously the shafts may be turned by hand to secure any desired color of beam and motor driven when an ever changing color of beam is wanted.

It will become evident to those skilled in the art that a photographic mat can be made very easily by merely substituting a photographic plate in the taking aperture after the image V has been focused on the ground glass, making an exposure on the photographic plate and then developing by the reversal method to produce a positive on the same plate. The positive may then be retouched by hand if necessary and used in the projection aperture substantially the same as the traced outline mat. Also, if the part of the lamp housing carrying the light source and condensers were made removable so as to view the projection aperture from the rear, in some instances where it is not necessary to imbed the projector in a wall, the mat could be traced in the projection aperture and made substantially in the same manner as described in the preferred form.

It is also understood that any changes, modifications or substitutions that are equivalents for the above described invention are meant to be included in the following claims.

I claim as my invention:

1. The method of illuminating a predetermined area having visible boundaries which includes: passing light from said area through a lens, dividing said light, causing one of said portions of light to produce an image on a support, treating said support to transform it into a mat of said area, placing said mat in the optical path of the other of said light portions at a distance from the point of division of said light equal to the distance of said support therefrom, and passing light through said mat and said lens to said predetermined area to illuminate the same.

2. A method as described in claim 1 which includes varying the color of said light projected upon said area.

WILLIAM H. HARRISON.